(12) United States Patent
Pecnik et al.

(10) Patent No.: US 7,727,105 B2
(45) Date of Patent: Jun. 1, 2010

(54) PLANETARY GEARBOX COMPRISING A SLIDING COUPLING ELEMENT AND AN ACTUATOR

(75) Inventors: Hermann Pecnik, Nestelbach (AT); Werner Brendl, Eggersdorf (AT); Konstantin Erjawetz, Lannach (AT)

(73) Assignee: Magna Powertrain AG & Co KG, Lannach (AT)

( * ) Notice: Subject to any disclaimer, the term of this patent is extended or adjusted under 35 U.S.C. 154(b) by 434 days.

(21) Appl. No.: 10/573,866

(22) PCT Filed: Sep. 30, 2004

(86) PCT No.: PCT/AT2004/000328

§ 371 (c)(1),
(2), (4) Date: Jan. 24, 2008

(87) PCT Pub. No.: WO2005/031194

PCT Pub. Date: Apr. 7, 2005

(65) Prior Publication Data

US 2008/0128238 A1    Jun. 5, 2008

(30) Foreign Application Priority Data

Sep. 30, 2003   (AT) .............................. GM670/2003

(51) Int. Cl.
 *F16H 3/44*   (2006.01)
(52) U.S. Cl. ...................................... 475/299
(58) Field of Classification Search ................ 74/337.5, 74/339
See application file for complete search history.

(56) References Cited

U.S. PATENT DOCUMENTS

| 5,411,110 | A | 5/1995 | Wilson et al. |
| 5,492,194 | A | 2/1996 | McGinn et al. |
| 5,605,201 | A | 2/1997 | McGinn et al. |
| 6,165,103 | A | 12/2000 | Tenzor et al. |
| 6,173,624 | B1 * | 1/2001 | Decker .................. 74/473.37 |
| 6,565,475 | B2 * | 5/2003 | Williams et al. ............. 475/204 |
| 7,399,251 | B2 * | 7/2008 | Mueller et al. .............. 475/295 |

FOREIGN PATENT DOCUMENTS

| DE | 100 21 146 | | 11/2000 |
| DE | 199 20 064 | A1 | 11/2000 |
| DE | 102 23 224 | A1 | 12/2002 |
| EP | 0 659 605 | A2 | 6/1995 |

* cited by examiner

*Primary Examiner*—Dirk Wright
(74) *Attorney, Agent, or Firm*—Harness, Dickey & Pierce, P.L.C.

(57) ABSTRACT

A transmission including a ring gear engageable with clutch teeth. A shift fork connected to a cam roller is engageable with the ring gear. The cam roller includes at least one V-shaped groove, and an element is disposed between the V-shaped groove of the cam roller and a base of the shift fork such that rotation of the cam roller translates into displacement of the shift fork and the ring gear.

14 Claims, 4 Drawing Sheets

PLANETARY GEARBOX COMPRISING A SLIDING COUPLING ELEMENT AND AN ACTUATOR

FIELD

The present teachings are directed to a shiftable planetary transmission with a displaceable coupling element. The coupling element is displaceable by means of a shift fork that is movable by an actuator. The actuator includes a motor and a cam that is driven by the motor via a shaft, wherein the shift fork includes an element that engages a groove of the cam. The coupling element is generally a positive coupling, wherein the coupling teeth can be radially and axially arranged. With a radial arrangement, the ring gear of the planetary transmission may be a coupling element.

BACKGROUND

The statements in this section merely provide background information related to the present disclosure and may not constitute prior art.

Planetary transmissions, among others, are implemented in transfer cases of all-wheel-drive vehicles to make an on-road mode and an off-road mode available.

A planetary transmission of this kind is described in EP 659 605 B1. With this planetary transmission, the cam roller is driven by the supporting shafts over a torsion spring. This serves as an energy accumulator, if the positive coupling element does not quickly locate itself in the coupled position. This construction, however, is complex, the angular position of the cylindrical cam is never exactly known, and no stop is available. Hence, the disconnection in the end position is also unreliable.

Furthermore, a planetary transmission is described in U.S. Pat. No. 5,411,110, in which a rotatable disc that forms the shift cam cooperates with a sensing member, which in turn is coupled to the coupling element via two springs. Here, the responsiveness of the interlock and the force distribution are dependent on the difference of the forces of the two springs, which suffer from tolerances.

SUMMARY

An object of the present teachings is to improve shifting so that it is simpler, more reliable, and more precise. It should establish a reproducible association between the angular position of the cam and the position of the shift fork, and should yield upon exceeding a predetermined actuating force. In accordance with the present teachings this is achieved in that the cam is, in cross-section, a V-shaped groove with sloping sidewalls. The element of the shift fork is pressed by a spring into the groove. In this arrangement, the shift fork can be displaceable or pivotable, and the cam can be disc- or barrel-shaped.

Through rotation of the cam, the rotational movement is transposed into a translational movement through the spring-biased element that engages the groove. This produces a precise guidance and positioning of the shift fork, and additionally an overload safeguard. That is to say, if a specific guidance force is exceeded, the element climbs up one of the sloping sidewalls against the force of the spring. This happens when both coupling components stand tooth-to-tooth. The cam can then rotate further until in its end position. If the teeth are marginally misaligned, they are brought into engagement by the energy stored in the spring. In this arrangement, the target position is precisely defined again by the bottom of the groove. Still a further advantage is achieved in that, if shifting at low speeds, or if one of the coupling elements to be coupled experiences a speed increase, the reaction force acting on the electric motor is also limited.

In an advantageous and space-saving embodiment, the cam is essentially a cylindrical cam roller with a groove disposed on its surface. In this way, it is possible to provide the sidewalls of the groove, which is V-shaped in cross-section with independent and different angles of inclination. In this manner, the threshold, at which the overload safeguard functions, can be provided differently for the two movement directions. In particular, a situation is achieved in that the effect only occurs upon engagement of the coupling element, but not with disengagement. Hence, disengagement is also possible even when the coupling is not completely torque-free. Furthermore, the effect can be doubled without increase of the required packaging space, if two grooves are provided on the cam roller and an element of the shift fork engages in each of the two grooves.

If, furthermore, the shift fork is not pivotably, in particular translatably, guided, a particularly advantageous and compact embodiment is provided in which the shift fork has a tubular base surrounding the cam roller, which, together with the cam roller, forms a rectilinear guide for the shift. Consequently, the drive and the guide are combined by a pairing of components.

If, with this construction, the grooves are phase-shifted about a centering angle of 180° and the elements of the shift fork lie opposite to one another, the force exerted by springs of the elements balance one another. In this manner, the friction between the cam roller and the base is reduced. As a result, higher precision, improved response of the interlock, and low force requirement occur.

In a compact and assembly friendly further development of the present teachings, the element of the shift fork is received within a spring containing cage, which is in turn mounted at a corresponding through hole of the tubular base.

The element of the shift fork is preferably a rotatably supported ball. This is not only kinematically ideal, it also reduces the friction and the demands on the performance of the electric motor. This in a particularly high measure, if the rotatable support of the ball is friction free.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In following, the invention will be described and explained with reference to the Figures. There is shown in.

DETAILED DESCRIPTION

The following description is merely exemplary in nature and is not intended to limit the present disclosure, application, or uses.

Figure 1:
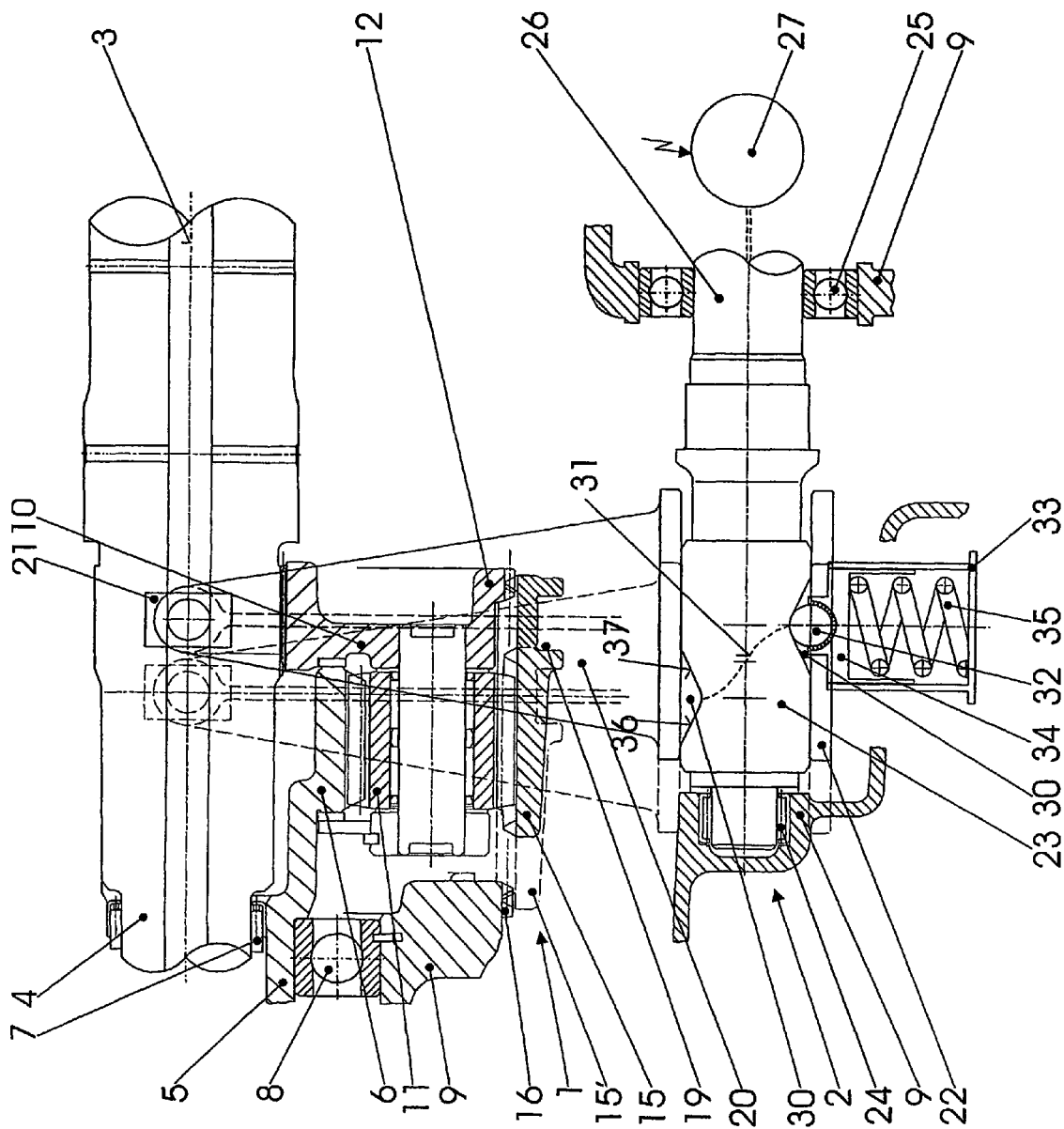
FIG. 1 is a partial longitudinal section of a planetary transmission with an actuator in accordance with the present teachings.

In FIG. 1, a planetary transmission is summarily indicated by 1, a central axis by 3 and an actuator summarily by 2. The planetary transmission 1 comprises a primary shaft 4, a concentric secondary shaft 5 surrounded by a sun gear 6, a planet carrier 10 including planetary gears 11 and a first set of clutch teeth 12, and a ring gear 15. One of the bearings 7 can be seen between the primary shaft 4 and the secondary shaft 5, and one of the bearings 8 can be seen between the secondary shaft 5 and a housing 9, of which only a fragment is shown. The ring gear 15, corresponds to a gear step of the planetary transmission 1, and engages the clutch teeth 12 of the planetary carrier 10. In another position, illustrated in phantom, the ring gear 15' engages a second set of clutch teeth 16 of the housing 9.

The ring gear 15 has a guide groove 18, in which the slide ring 21 of a shift fork 20 engages. The guide groove 18 is formed on the ring gear 15 in the illustrated exemplary embodiment. It can, however, also be located on any other shift movable component of the planetary transmission 1.

Figure 2:
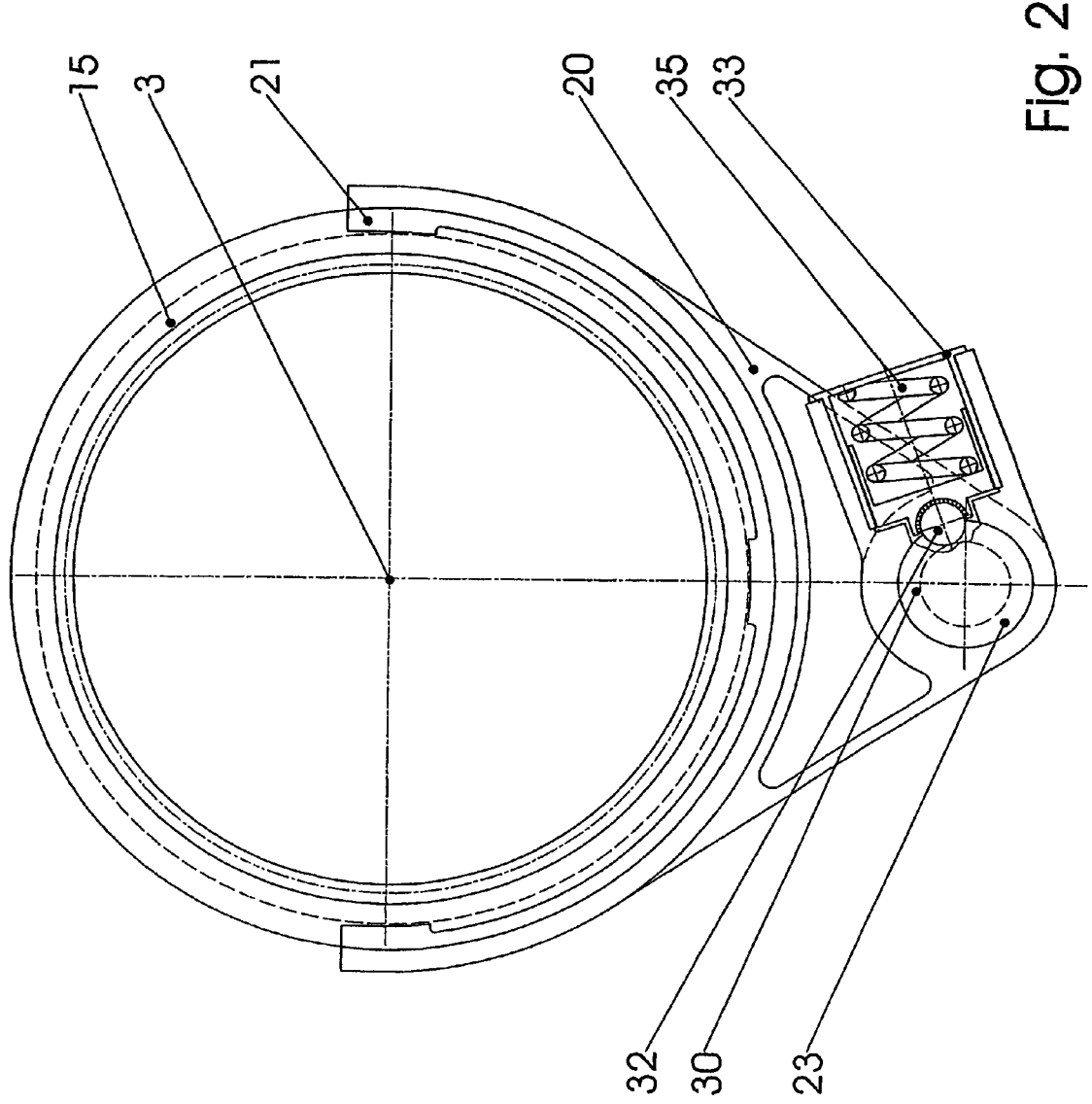
FIG. 2 is a cross-section along line A-A in FIG. 1.

In FIG. 1 and FIG. 2 it can be seen that the shift fork 20 has a tubular base 22, which surrounds a cam roller 23, upon which it is movable along an axis. The cam roller 23 is rotatably fixedly connected to a shaft 26, which is rotatable in the bearings 24 and 25 and is driven by a motor 27. The motor 27 is a controlled electric motor with or without a gear reduction drive. A groove 30 with a V-shaped cross-section can be seen at the periphery of the cam roller 23. The side walls 36 and 37 (FIG. 1) of this groove are helical surfaces, which is indicated by the phantom line 31. The cross-sections of the groove 30 illustrated in FIG. 1 at the opposing generatrices are consequently profiles of one and the same groove.

An element that cooperates with the groove 30 is mounted on the tubular base 22. The element, as shown here for example, is a ball 32 which is disposed in a piston 34 in a particularly low friction manner. The piston 34 is guided in a cage 33 and loaded by a spring 35. Thus, the ball 32 is pressed by the spring 35 into the groove 30 which brings about translation of the rotational movement of the shaft 26 to the displacement of the shift fork 20.

Figure 3:
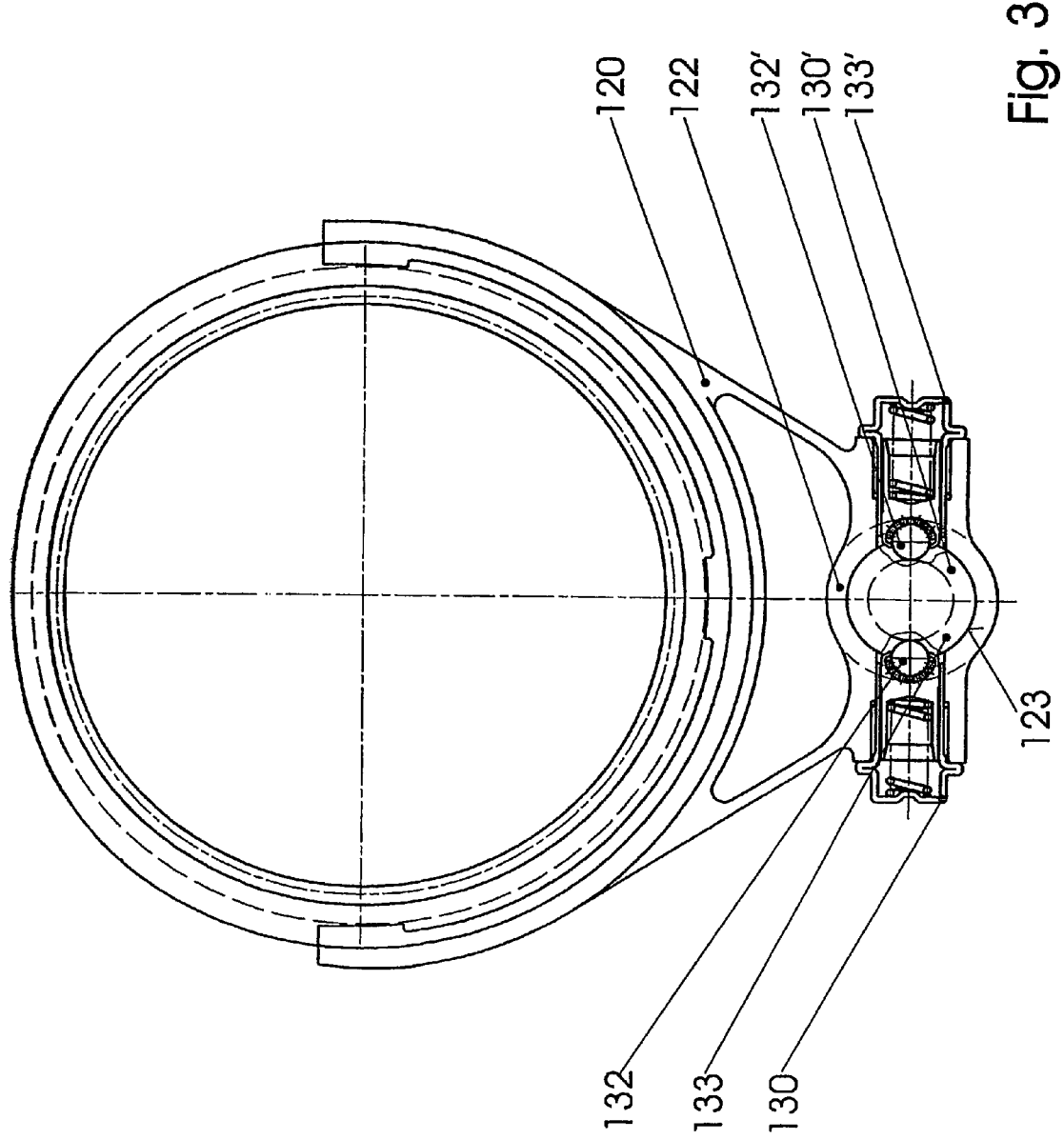
FIG. 3 is a variant of FIG. 2.
Figure 4:
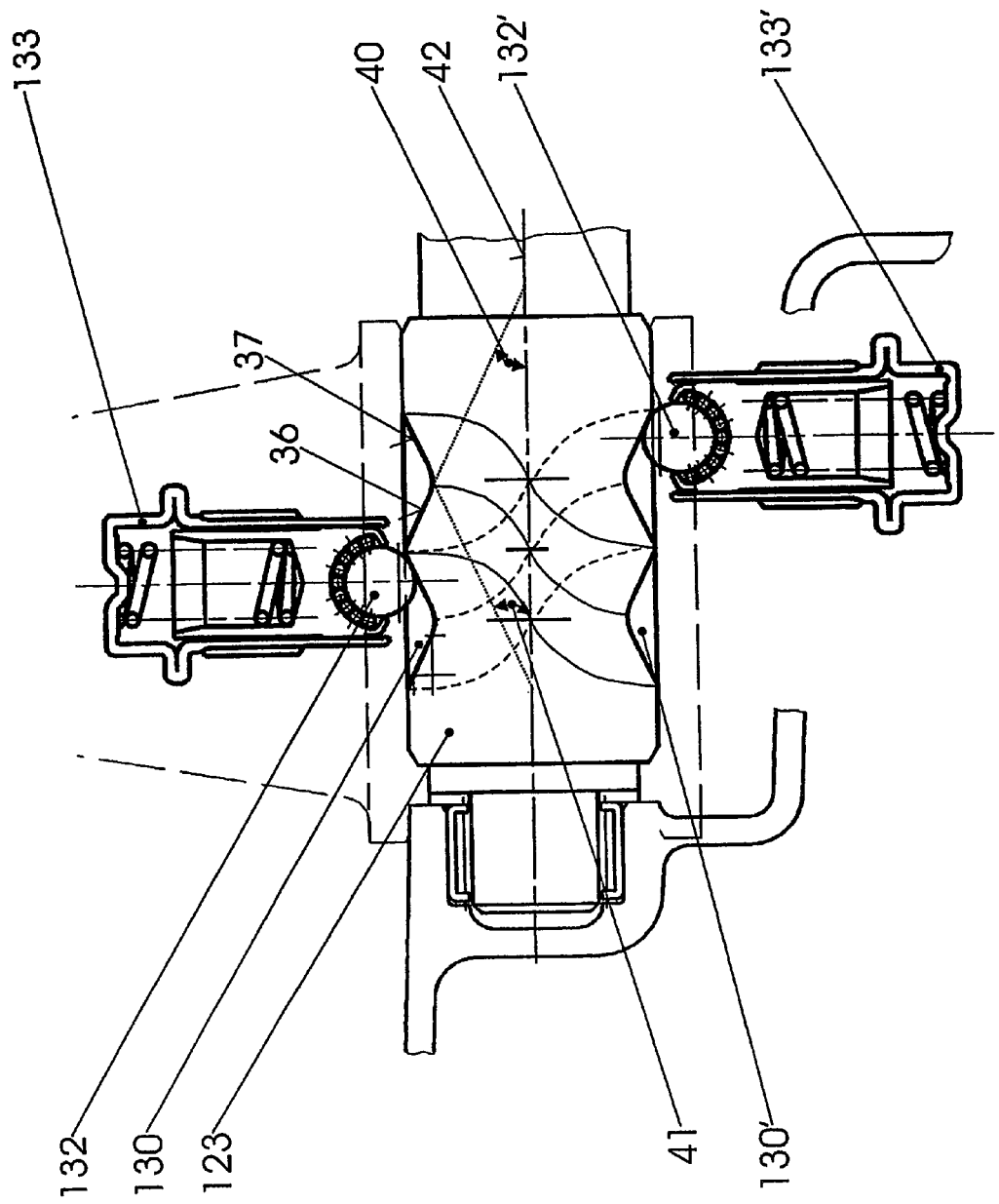
FIG. 4 is an enlarged cross-section along line B-B in FIG. 3.

As shown in FIG. 3, two balls 132 and 132' in cages 133 and 133' may be oppositely mounted at the tubular base of the shift fork 120. In FIG. 4 the grooves 130 and 130' phase-shifted by 180°. It is also recognizable that the side walls 36 and 37 of the groove 130' include angles 40 and 41, which may be different from one another, relative to the generatrix of the cam roller 23 and with its central axis 42, respectively.

The operating mode of the spring loaded balls in cooperation with the grooves is the following: as long as the actuation force required for the translational movement of the ring gear 15 is normal, the V-formed grooves function as a groove with orthogonal walls and they produce a precise relationship between the angular position of the shaft 26 and the shift position of the ring gear 15 (i.e., of the shift fork 20). If, however, a hindrance occurs upon displacement of the ring gear, for instance when the teeth of the ring gear 15 do not engage with the clutch teeth 16 in the housing 9, then the ball 132 (as seen in FIG. 4) climbs up the side wall 36 and 37 against the force of the spring acting on it.

The actuation force at which this "overload coupling" begins to act depends on the pitch 40 and 41 of the side walls 36 and 37 and naturally from the force of the spring acting on the ball 132. When the described hindrance can only occur in one shift direction and not in the opposite direction, the angles 40 and 41 may be selected to be different from one another. The angles 40 and 41 also do not have to be constant over the entire length of the V-formed groove. They can be variably designed in accordance with the shift requirements.

What is claimed is:

1. A shiftable planetary transmission comprising:
a displaceable coupling element;
a shift fork engageable with said coupling element; and
an actuator including a motor and a cam driven by said motor via a shaft, said coupling element being displaceable by said shift fork being moved by said actuator,
wherein said shift fork includes an element that engages a groove of the cam;
said groove said cam is V-shaped in cross-section, said V-shaped groove having inclined side walls; and
said element of the said shift fork is pressed into said groove by a spring.

2. A planetary transmission of claim 1, wherein said cam is a substantially cylindrical cam roller with at least one of said groove being disposed on a surface thereof.

3. The planetary transmission of claim 2, wherein said side walls of said V-shaped groove are inclined at angles which are different from one another relative to an axis of said cam.

4. The planetary transmission of claim 2, wherein said cam roller includes a pair of said V-shaped grooves, and said shift fork includes a pair of elements that engage in each of said V-shaped grooves.

5. The planetary transmission of claim 2, wherein said shift fork has a tubular base that surrounds said cam roller, and said roller and said base together form a linear guide of said shift fork.

6. The planetary transmission of claim 4, wherein said V-shaped grooves are phase shifted about a center angle of 180° relative to an axis of said cam roller, and said elements are positioned opposite to one another.

7. A planetary transmission of claim 4, wherein each element of said shift fork is received within a cage retaining said spring, said cape being mounted to a through hole of a tubular base of said shift fork.

8. The planetary transmission of claim 1, wherein said element of said shift fork is a rotatably supported ball.

9. A transmission comprising:
a carrier having a plurality of gears and a plurality of clutch teeth;
a ring gear engageable with said clutch teeth;
a shift fork including a base, said shift fork being engageable with said ring gear; and
a cam roller including at least one V-shaped groove connected to said shift fork, said base of said shift fork surrounding said V-shaped groove of said cam roller;
wherein an element is disposed between said V-shaped groove of said cam roller and said base of said shift fork such that rotation of said cam roller translates into displacement of said shift fork and said ring gear.

10. The transmission of claim 9, wherein said V-shaped groove is helical.

11. The transmission of claim 9, further comprising a spring that presses said element into said V-shaped groove.

12. The transmission of claim 9, wherein said V-shaped grooves includes a pair of sidewalls and an angle of each sidewall relative to an axis of said cam roller is different.

13. The transmission of claim 9, wherein said cam roller further comprises another V-shaped groove and another element is disposed between said cam roller and said base in said another V-shaped groove, each V-shaped groove and corresponding element being disposed on opposite sides of said cam roller.

14. The transmission of claim 9, wherein said element is a ball-shaped member.

* * * * *